Patented Oct. 4, 1949

2,483,797

UNITED STATES PATENT OFFICE 2,483,797

TALL OIL ACID COMPOSITION

Edward A. Van Valkenburgh, Greene, N. Y.

No Drawing. Application November 23, 1948,
Serial No. 61,744

6 Claims. (Cl. 260—97.5)

1

This invention relates to improvements in tall oil compositions for use in the compounding and vulcanization of rubber.

The new compositions used according to the present invention are compositions made by reacting tall oil acids or modified tall oil acids with aliphatic amines in such proportions that the acids are present in substantial excess and the amines are reacted with the acids to form amine salts or soaps which are free from any substantial amount of unreacted amine so that the composition is made up essentially of amine salts or soaps of the acids with a substantial excess of free acids, and said compositions advantageously contain around 10 to 20% by weight of a compatible liquid hydrocarbon solvent.

Tall oil acids are produced as a by-product from the paper pulp industry and may have an acid number of, e. g., around 165 and may contain, e. g., around 45% of cyclic rosin acids, around 45% of straight chain fatty acids, and around 10% of sterols and other higher alcohols. Depending upon the method of separation and refining the composition may vary somewhat but in general will contain relatively large proportions of both rosin acids and fatty acids. On standing at ordinary temperatures tall oil acids usually separate into a lower semi-solid layer and an upper liquid layer. Such a product presents difficulties for use in rubber compounding. When tall oil acids are heated to relatively high temperatures for sufficient periods of time and particularly with the presence of catalysts some of the tall oil acids may undergo modification but the modified acids will still contain relatively large proportions of fatty acids and resin acids or modified acids resulting from the heat treatment.

The present invention enables tall oil acids to be advantageously used in the compounding and vulcanization of natural and synthetic rubber by combining part of the tall oil acids with aliphatic amines under conditions such that the amine is combined with substantial or approximate completion with part of the acids to form amine salts or soaps while leaving a substantial part of the acids uncombined and in a free state.

In preparing the new compositions the tall oil acids are heated to an elevated temperature, e. g., around 125° C., so that they are completely liquid and the amine or amines are added thereto in the desired amount and cause to react therewith while maintaining the reaction mixture at an elevated temperature until the amines, which may be gradually added, have reacted with substantial or approximate completeness with part of the tall oil acids. This reaction gives a composite product containing the amine salts or soaps and the free acids in the form of a substantially homogeneous admixture which may be liquid or of semi-solid consistency when cooled to ordinary temperatures.

When a limited amount of amine is reacted with the composite acids of tall oil there appears to be a selective reaction with certain of the acids and I have been led to believe that the reaction is largely or mainly with the fatty acids first and then with part of the resin acids, leaving the unreacted acids made up largely of resin acids or with a substantially larger proportion of free resin acids than in the original tall oil acids reacted.

Various aliphatic amines can be used in making the new compositions. I consider primary amines more suitable than secondary or tertiary amines; and that amines of intermediate molecular weight are more advantageous than those which are more volatile or of too high a molecular weight. Thus I consider amylamines as more advantageous than ethyl- and butylamines. Secondary amines such as dibutylamine, for example, can be used; and are advantageously used in conjunction with primary amines. Polyamines are advantageously used which contain both primary and secondary amine groups in the same molecule such as the polyethylene polyamine; and a particularly advantageous polyamine is tetraethylene pentamine. Instead of using a single amine a mixture of different aliphatic amines may be used for reacting with the tall oil acids.

The proportions of amines and tall oil acids used can also be varied with corresponding variation in the proportion of amine salts or soaps and of free acids in the resulting composition. Thus from 10% to 90% of amine or amines may be used based on the acids of the tall oil acid mixture. With smaller amounts of amines, e. g., 10%, the resulting composition will be made up largely of unreacted free acids. When larger proportions of amines are used, e. g., around 90%, there will still be a substantial excess of free acids, e. g., around 10% over that which can react with the amines to form salts or soaps. By varying the relative proportions of amines and tall oil acids compositions of intermediate proportions of amine salts or soaps and of free tall oil acids can be produced.

Preparation of the new compositions will be further illustrated by the following examples. The tall oil acids are first heated to a temperature of e. g., 125° C. with mechanical stirring for, e. g., about one hour before beginning to add the amine. The amine is then added gradually until the desired amount has been added and the mixture is maintained at a temperature of e. g., 125° C. with continued mechanical stirring for a period of time of e. g., one half hour, to insure reaction of the amine with part of the tall oil acids so that the reaction product will be free or relatively free from unreacted amine. Where relatively volatile amines are used the reaction can best be carried out in closed vessels. A compatible hydrocarbon solvent or liquefying agent such as a mixture of petroleum hydrocarbons or medium coal tar oil is advantageously added to the composition and thoroughly incorporated therein, e. g., to the extent of around 10 or 20% by weight to convert the semi-solid compositions into uniform fluid products to facilitate their use in rubber compounding.

*Example 1.*—A composition may thus be made from tall oil acids and monoamylamine in the proportions of 80 parts of tall oil acids and 20 parts of monoamylamine corresponding to around 90% of the molar equivalent weight of the amine. This composition without the addition of hydrocarbon solvent or liquefying agent is a semi-solid paste. But when 10 to 20% by weight of a hydrocarbon oil such as medium coal tar oil or petroleum hydrocarbons are added thereto the semi-solid composition is converted into a uniform fluid product well adapted for use in rubber compounding.

*Example 2.*—A composition is made of crude tall oil and monobutylamine with hydrocarbon solvents in the following parts by weight:

Crude tall oil _____ 74.21
Medium process petroleum oil _____ 11.52
Non-volatile coal tar oil _____ 2.83
Monobutylamine _____ 11.44

The amount of amine used in this composition corresponds to approximately 74% of the molar equivalent weight required for complete neutralization of the tall oil used. The presence of the hydrocarbon oils used as a solvent or diluent stabilizes the composition against subsequent solid sedimentation.

*Example 3.*—A composition is made from crude tall oil with monoamylamine and with coal tar oil as a diluent in the following proportions:

Crude tall oil _____ 88.35
Coal tar oil _____ 5.75
Monoamylamine _____ 5.90

In this composition the monoamylamine is equivalent to approximately 20% of the molar equivalent weight required for neutralization of the tall oil acids.

*Example 4.*—A similar composition to that of Example 3, but representing approximately 52% neutralization of the tall oil acids, is made from the following proportions:

Crude tall oil _____ 83.00
Coal tar oil _____ 5.75
Monoamylamine _____ 11.25

*Example 5.*—Crude tall oil is used with tetraethylene pentamine and with light petroleum oil as a solvent in the following proportions:

Crude tall oil _____ 75.00
Petroleum oil _____ 23.00
Tetraethylene pentamine _____ 2.00

Such a product is made, for example, as above described by preheating and over-melting the crude tall oil at 350° F. for half an hour with efficient stirring, admixing the diluent hydrocarbon oil, with continued stirring while cooling to 150° F. and then adding the tetraethylene pentamine well below the surface with effective agitation and with very gradual addition so that the temperature does not rise above 250° F.; and the agitation is continued for at least another half hour after all of the amine reagent has been added to insure completion of the reaction.

The composition of this example contains an amount of tetraethylene pentamine corresponding to approximately 23.4% of that required to neutralize the tall oil acid.

*Example 6.*—A composition containing a higher percentage of tetraethylene pentamine is illustrated by the following proportions:

Crude tall oil _____ 97.17
Coal tar oil _____ 2.77
Petroleum oil _____ 12.37
Tetraethylene pentamine _____ 5.69

The composition of this example corresponds to approximately 66.4% neutralization of the tall oil acids.

Tetraethylene pentamine is particularly advantageous for use in forming the under-neutralized tall oil acid soaps, since a single molecule of the tetraethylene pentamine can react with the tall oil acids both at the terminal amine groups and at the intermediate imime groups. Such compositions have been found particularly advantageous. They appear to be sufficiently stable to persist as polyamine soaps not only through the mixing and curing of GR-S tread compositions but contribute superior flex-life and substantially increased cut-growth resistance to the tire tread.

The above compositions, in which a substantial proportion of the tall oil acids have been neutralized with the aliphatic amines, and which contain a substantial proportion of unreacted tall oil acids, probably mainly resin acids, have the advantage that their use overcomes the detrimental cure retardation effect of tall oil acids in rubber compounding. And yet their under-neutralization obviates or minimizes scorching or progressive over-cure in service at elevated temperatures, as in the case of pneumatic tire treads, for example.

The freedom from uncombined amine and the presence of both amine soap and excess tall oil acids give the compositions a combination of desirable properties from the standpoint of cure activation and minimizing of over-curing.

Thus, the new under-neutralized composition with excess of free tall oil acids and containing the amine combined with part of the tall oil acids provide adequate cure-activation efficiency to contribute to a desirable improvement in resistance to flexing which is important in GR-S synthetic rubber tire tread compound. At the same time the excess of free tall oil acid prevents the rubber compound from being too "scorchy" to process well prior to vulcanization, and prevents highly detrimental persistence of "after-cure" in service, especially when used as activators in conjunction with thiazole accelerators.

The new compositions are advantageously used in the compounding of synthetic rubber, including rubbers commonly known under the name of Buna S, Buna N, GR-I, GR-S, butyl rubber, and Thiokol rubber. The compositions are particularly advantageous in compounding rubber of the type known as Buna S or GR-S. The use of the new compositions enables a wide, flat curing range for synthetic rubber compounds to be obtained whereby undercures yield relatively high modulus while over-cures develop a comparatively low percentage decrease in elongation. The compositions when used with Buna S synthetic rubber enable vulcanized products to be obtained of improved cut-growth resistance without causing higher "heat build-up" under repeated flexing.

The composition can also advantageously be used in natural rubber compounding. Thus, in spite of the comparatively high iodine number of the unsaturated tall oil acids from which the compositions are manufactured, the under-neutralized aliphatic amine soap compositions provide such a great enhancement of cured rubber quality that they can safely be used in natural rubber compounding, as well as in synthetic rubber, without jeopardizing satisfactory resistance to ageing. Particularly in natural rubber tire carcass stocks the compositions are valuable tackifying plasticizers, providing improved raw processing, in addition to a desirable cure-activation effect during subsequent vulcanization.

This advantageous, efficient cure-activation, for under-cures, while still avoiding undue stiffening of modulus for over-cures, is illustrated by the following examples of GR-S synthetic rubber tire treads in which the compositions of different examples described above were used.

GR-S tire carcass stock was made with the composition of Example 1, containing about 90% of monoamylamine combined with the tall oil acids and having around 10% of the tall oil acids in a free state.

| Compound | A |
|---|---|
| GR–S Rubber | 100 |
| EPC Black (Channel black) | 30 |
| Zinc Oxide | 4 |
| Captax | 1 |
| Sulfur | 3 |
| Dipentene | 2.5 |
| Pine Tar | 4 |
| Rosin | 3 |
| Composition of Example 1 | 4 |

This compound was cured for different periods of time and the unaged samples tested at room temperature gave the following results for tensile in pounds per square inch and for elongation:

| Cure at 270° F. | Tensile | Elongation |
|---|---|---|
| 30' | 2,240 | 780 |
| 45' | 1,980 | 630 |
| 60' | 2,200 | 590 |
| 75' | 1,980 | 560 |
| 90' | 1,880 | 555 |

The compound was also subjected to tests for normal stress at 300% and 500% modulus and for Shore hardness with the results shown in the three columns below:

Cure at 270° F.:
```
30' ------------------ 400    870   46
45' ------------------ 480  1,170   51
60' ------------------ 580  1,500   54
75' ------------------ 620  1,530   55
90' ------------------ 660  1,530   53
```

The above results indicate a comparatively mild supplementary acceleration or cure-activation effect during vulcanization whereby after long over-cures the vulcanized products still retain a high percentage of the original under-cured elongation and do not develop high modulus values.

The composition of Example 1 was also used in varying amounts in GR-S tire carcass stocks prepared with the following composition:

| Compound | A | B | C |
|---|---|---|---|
| GR-S | 100 | 100 | 100 |
| EPC (Channel black) | 30 | 30 | 30 |
| Zinc Oxide | 4 | 4 | 4 |
| Dipentene | 2.5 | 2.5 | 2.5 |
| Pine Tar | 4 | 4 | 4 |
| Rosin | 4 | 4 | 4 |
| Bardol (Medium coal tar oil) | | 2 | 2 |
| Captax | 1 | 1 | 1 |
| Sulfur | 3 | 3 | 3 |
| Composition of Example 1 | 0.5 | 1 | 1.5 |

These three compounds when the unaged samples were tested at room temperature, gave tensiles in pounds per square inch and elongations as shown in the respective two columns under each of the compounds and cured for the times indicated.

| Cure at 270° F. | A | | B | | C | |
|---|---|---|---|---|---|---|
| 30' | 150 | 1,170 | 780 | 1,133 | 1,320 | 1,000 |
| 45' | 590 | 1,200 | 1,310 | 940 | 1,700 | 890 |
| 60' | 980 | 1,070 | 1,470 | 810 | 1,860 | 766 |
| 75' | 1,240 | 970 | 1,350 | 696 | 1,740 | 690 |
| 90' | 1,190 | 830 | 1,350 | 616 | 1,660 | 623 |

These same compounds were subjected to tests for stress at 300% and 500% modulus and for Shore hardness and the three respective results obtained are tabulated in the three columns below under each of these compounds:

| Cure at 270° F. | A | | | B | | | C | | |
|---|---|---|---|---|---|---|---|---|---|
| 30' | | | 21 | 50 | 120 | 30 | 150 | 350 | 31 |
| 45' | | 100 | 26 | 120 | 290 | 38 | 230 | 470 | 40 |
| 60' | 60 | 240 | 32 | 200 | 480 | 42 | 350 | 750 | 44 |
| 75' | 150 | 300 | 36 | 270 | 600 | 45 | 370 | 850 | 46 |
| 90' | 180 | 420 | 39 | 370 | 810 | 46 | 470 | 990 | 49 |

As indicated above, one advantage of the present invention is that progressively more efficient cure-activation effects are obtained by increasing the percentage of amine used and combined with the tall oil acids.

A tire tread stock was compounded, respectively, with the compositions of Examples 3 and 4, as follows:

| Compound No. | A | B |
|---|---|---|
| GR S Synthetic Rubber | 100 | 100 |
| Easy Processing Channel Black | 25 | 25 |
| High Modulus Furnace Black | 25 | 25 |
| Zinc Oxide | 2.5 | 2.5 |
| Rosin | 3.0 | 3.0 |
| Petroleum Oil | 4.0 | 4.0 |
| Sulfur | 1.75 | 1.75 |
| "Sanctocure" (Activated Mercaptobenzothiazole) | 1.25 | 1.25 |
| Composition of Example 3 | 4.50 | |
| Composition of Example 4 | | 4.50 |

After having been cured at 45 lbs. steam pressure for 15, 30, 45, 60, 75 and 120 minutes, respectively, the above compounds A and B gave the following 400% modulus and tensile values:

| Cures at 45 lbs. steam, minutes | 400% Modulus, lbs. per sq. in. | | | | | |
|---|---|---|---|---|---|---|
| | 15 | 30 | 45 | 60 | 75 | 120 |
| Compound A | | 940 | 1,230 | 1,300 | 1,370 | 1,420 |
| Compound B | 610 | 1,140 | 1,210 | 1,250 | 1,200 | 1,260 |

The above modulus values emphasize the "flat-cure curves" contributed by the under-neutralized tall oil soaps of the present invention.

The composition of Example 3 in compound A cures more slowly. But the composition of Example 4 (being more highly neutralized), while it provides a much faster rate of cure, still gives excellent low modulus values for the longer cures.

| Cures at 45 lbs. steam, minutes | Ultimate Tensile Strength, lbs. per sq. in. | | | | | |
|---|---|---|---|---|---|---|
| | 15 | 30 | 45 | 60 | 75 | 120 |
| Compound A | | 2,270 | 2,420 | 2,560 | 2,580 | 2,460 |
| Compound B | 2,040 | 2,550 | 2,600 | 2,650 | 2,620 | 2,410 |

Here also, while the 15 minute cure emphasizes a great difference in the curing rate, the more highly neutralized composition of Example 4 in compound B compares very favorably with the composition of Example 3 for the 120 minute long overcure.

As further illustrating the use of the compositions of the present invention a somewhat stiffer GR-S tire tread stock was compounded with the compositions of Examples 5, 6 and 2 as follows:

| Compound No. | C | D | E |
|---|---|---|---|
| GR-S Synthetic Rubber | 100 | 100 | 100 |
| Medium Processing Channel Black | 45 | 45 | 45 |
| Zinc Oxide | 5 | 5 | 5 |
| Mineral Rubber (oxidized asphalt) | 2 | 2 | 2 |
| Paraflex (Liquid asphalt) | 3 | 3 | 3 |
| Sulfur | 2.0 | 2.0 | 2.0 |
| Captax (mercaptobenzothiazole) | 1.2 | 1.2 | 1.2 |
| Phenylbetanaphthylamine | 1.0 | 1.0 | 1.0 |
| Composition of Example 5 | 25. | | |
| Composition of Example 6 | | 2.5 | |
| Composition of Example 2 | | | 2.5 |

The three above tread compounds, when cured 15, 30, 45, 60 and 90 minutes at 292° F., yielded 500% modulus and ultimate tensile strength values, as follows:

| Cures at 292° F., Minutes | 500% Modulus, lbs. per sq. in. | | | | |
|---|---|---|---|---|---|
| | 15 | 30 | 45 | 60 | 90 |
| Compound C | 50 | 310 | 650 | 940 | 1,350 |
| Compound D | 170 | 720 | 1,220 | 1,540 | 1,960 |
| Compound E | 300 | 1,060 | 1,480 | 1,810 | 2,150 |

| Cures at 292° F., Minutes | Tensile Strength, lbs. per sq. in. | | | | |
|---|---|---|---|---|---|
| | 15 | 30 | 45 | 60 | 90 |
| Compound C | 90 | 910 | 1,950 | 2,480 | 3,120 |
| Compound D | 390 | 1,820 | 2,570 | 3,050 | 3,340 |
| Compound E | 890 | 2,600 | 3,140 | 3,410 | 3,300 |

The above cured tread data show that the underneutralized tall oil soaps of the present invention, as they are more highly neutralized, when used respectively in tread compounds C, D and E, do progressively contribute a faster rate of cure and an enhancement of cured quality, which again emphasizes the flat cure-curve characteristics of the compositions (supplementary accelerators) of the present invention.

If danger of scorch trouble during raw processing indicates the use of a milder activator (such as compound C), the desired high cured quality can be obtained by curing for a longer time, and without danger of developing too stiff modulus values on long overcure and after ageing.

The foregoing examples illustrate the advantages of the use of the new compositions in compounding and vulcanizing synthetic and natural rubbers. It will be understood that variations can be made in the particular formulas and also in the percentages of the new compositions used. It is one advantage of the new compositions that they may be incorporated directly into the synthetic or natural rubber mix according to the usual methods of compounding. They may be compounded directly into the gum matrix, e. g., on a two roll mill or in a Banbury mixer or they may be incorporated indirectly by preliminary dispersion in liquid synthetic rubber latex with subsequent coagulation, or they may be preliminarily mixed with the carbon black or other powders used in rubber compounding before adding them with the admixed powders to the rubber compound.

This application is a continuation in part of my prior application Serial No. 590,109, filed April 19, 1945, now abandoned.

I claim:

1. A tall oil acid composition containing from about 10 to 90% of the aliphatic amine soaps of tall oil acids and from about 90 to 10% of free tall oil acids, said composition being free from uncombined amine.

2. A tall oil acid composition containing about 90% of aliphatic amine soaps of tall oil acids and about 10% of free tall oil acids, said composition being free from uncombined amine.

3. A tall oil acid composition made up to the extent of around 80 to 90% of a mixture of free tall oil acids and aliphatic amine soaps of tall oil acids, the amounts of free tall oil acids and of aliphatic amine soaps being each in excess of 10% of the mixture and said composition also containing around 10 to 20% of weight of a compatible liquid hydrocarbon solvent and being free from uncombined amine.

4. A composition as defined in claim 3 in which the aliphatic amine soaps are amylamine soaps.

5. A composition as defined in claim 3 in which the amine soaps are butylamine soaps.

6. A composition as defined in claim 3 in which the amine soaps are tetraethylene pentamine soaps.

EDWARD A. VAN VALKENBURGH.

No references cited.

Certificate of Correction

Patent No. 2,483,797             October 4, 1949

EDWARD A. VAN VALKENBURGH

It is hereby certified that errors appear in the printed specification of the above numbered patent requiring correction as follows:

Column 4, line 16, for "97.17" read *79.17*; column 6, in the first table, second column thereof, opposite "Bardol (Medium coal tar oil)" insert the numeral *2*; column 7, in the second table, second column thereof, opposite "Composition of Example 5", for "25." read *2.5*; column 8, line 50, for "of weight" read *by weight*;

and that the said Letters Patent should be read with these corrections therein that the same may conform to the record of the case in the Patent Office.

Signed and sealed this 14th day of February, A. D. 1950.

[SEAL]

THOMAS F. MURPHY,
                             *Assistant Commissioner of Patents.*